No. 702,905. Patented June 24, 1902.
A. M. ACKLIN.
CONVEYER.
(Application filed Apr. 14, 1902.)
(No Model.)
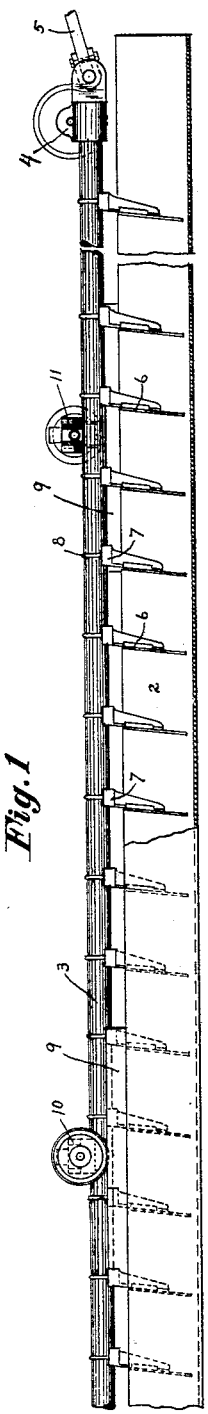
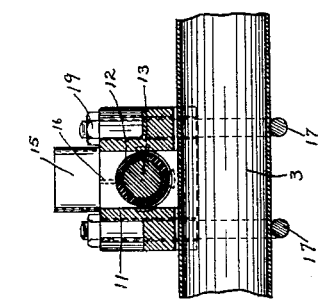
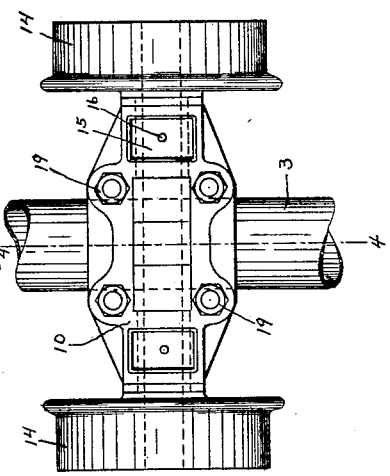
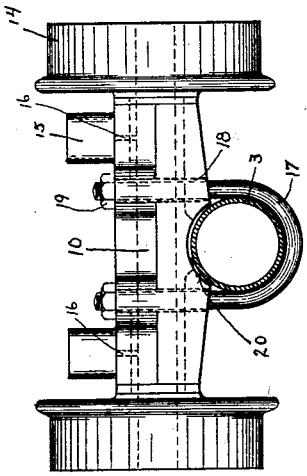
Witnesses.
Inventor.
Attorneys.

UNITED STATES PATENT OFFICE.

ALFRED M. ACKLIN, OF PITTSBURG, PENNSYLVANIA, ASSIGNOR TO HEYL AND PATTERSON, A COPARTNERSHIP OF PENNSYLVANIA.

CONVEYER.

SPECIFICATION forming part of Letters Patent No. 702,905, dated June 24, 1902.

Application filed April 14, 1902. Serial No. 102,786. (No model.)

*To all whom it may concern:*

Be it known that I, ALFRED M. ACKLIN, a resident of Pittsburg, in the county of Allegheny and State of Pennsylvania, have invented a new and useful Improvement in Conveyers; and I do hereby declare the following to be a full, clear, and exact description thereof.

My invention relates to conveyers, and has special reference to the style of conveyer set forth in Letters Patent of the United States No. 605,621, granted to me June 14, 1898.

The object of the present invention is to provide a simple and durable form of truck or carriage for supporting the reciprocating bar and the flights carried thereby; and to these ends the invention comprises, generally stated, a truck-frame having bearings at each end thereof and an axle journaled in said bearings provided with wheels rigidly secured thereto to run on the track provided for same.

To enable others skilled in the art to make and use my invention, I will describe the same more fully, referring to the accompanying drawings, in which—

Figure 1 is a side view of a portion of the conveying apparatus embodying my invention. Fig. 2 is an enlarged view of the truck with the reciprocating flight-bar secured thereto and shown in cross-section. Fig. 3 is a plan view of said truck. Fig. 4 is a cross-section on line 4 4, Fig. 3.

Like numerals indicate like parts in each of the figures.

As before stated, my invention is to be used in connection with a conveyer in which swinging flights are employed and move the material to be conveyed through the receiving-trough. Accordingly the numeral 2 designates such a receiver or trough, of any desired length, and into this the material to be conveyed is introduced. A bar 3 circular in form is adapted to be reciprocated with the carriage 4 connected to the pitman 5, all as illustrated and described in said Letters Patent.

Secured to the bar 3 at proper intervals are the flights 6, which are hinged to the flight-frames 7, said flight-frames having the downwardly-projecting arms adapted to support said flights from behind. The flight-frames 7 are connected to the bar 3 by U-bolts 8, said bolts passing around the bar 3 and through openings in said flight-frames, where nuts engage said bolts and hold said flight-frames securely in place.

A track 9 is arranged parallel with the trough 2, and at intervals on said track are the trucks or carriages 10. These trucks 10 consist of a body portion 11, which may be formed of cast-iron, said body portion having the journal-boxes 12 at each end thereof. The journal-boxes 12 are provided with bearings of Babbitt or other suitable metal, which form bearings for the axle 13. Keyed or otherwise secured to the axle 13 are the wheels 14, which run on the track 9.

The body portion 11 is provided with the waste-boxes 15 for the reception of wool waste, and an oil-hole 16 leads from said box to the bearings of the axle.

The bar 3 is secured to the truck 10 by means of the U-bolts 17, said bolts passing up through openings 18 in the body portion of said truck. The nuts 19 engage the ends of said bolts, and as said nuts are tightened the U-bolts are drawn up, so as to rigidly embrace said bar and prevent its displacement. The body portion of the truck is cut away, as at 20, to form a seat for the bar which conforms to the contour of said bar.

The trucks 10 are arranged at suitable intervals, and when the bar 3 is reciprocated said trucks move to and fro on the track. By the use of such trucks I provide a simple means of supporting the bar and flights, while at the same time they are strong and durable. By having the axles revolving in well-lubricated journal-boxes the trucks run smoothly and require but little attention, as the wheels do not work loose and wabble after a time, as in the case where lugs are loosely mounted on spindles.

What I claim as my invention, and desire to secure by Letters Patent, is—

In conveyers, the combination with a suitable receptacle, of a track arranged parallel therewith, a series of trucks on said track, each of said trucks comprising a body portion having bearings at each end thereof and an axle journaled in said bearings with wheels rigidly secured thereto, a reciprocating bar secured to said truck, and a series of swinging flights carried by said bar.

In testimony whereof I, the said ALFRED M. ACKLIN, have hereunto set my hand.

ALFRED M. ACKLIN.

Witnesses:
F. W. WINTER,
ROBERT C. TOTTEN.